(12) United States Patent
Weiberle et al.

(10) Patent No.: US 9,254,827 B2
(45) Date of Patent: Feb. 9, 2016

(54) OPERATION OF A BRAKE BOOSTER AS A PEDAL SIMULATOR

(75) Inventors: Reinhard Weiberle, Vaihingen/Enz (DE); Timo Jahnz, Besigheim (DE)

(73) Assignee: Robert Bosch GmbH, Stuttgart (DE)

( * ) Notice: Subject to any disclaimer, the term of this patent is extended or adjusted under 35 U.S.C. 154(b) by 149 days.

(21) Appl. No.: 13/140,952

(22) PCT Filed: Nov. 16, 2009

(86) PCT No.: PCT/EP2009/065196
§ 371 (c)(1),
(2), (4) Date: Jun. 20, 2011

(87) PCT Pub. No.: WO2010/069688
PCT Pub. Date: Jun. 24, 2010

(65) Prior Publication Data
US 2011/0251769 A1   Oct. 13, 2011

(30) Foreign Application Priority Data

Dec. 18, 2008 (DE) .......................... 10 2008 054 849
Jun. 16, 2009 (DE) .......................... 10 2009 026 966

(51) Int. Cl.
| | |
|---|---|
| *G06F 19/00* | (2011.01) |
| *B60T 13/58* | (2006.01) |
| *B60T 1/10* | (2006.01) |
| *B60T 7/04* | (2006.01) |
| *B60T 8/44* | (2006.01) |
| *B60T 8/48* | (2006.01) |
| *B60T 13/74* | (2006.01) |

(52) U.S. Cl.
CPC ................. *B60T 13/586* (2013.01); *B60T 1/10* (2013.01); *B60T 7/042* (2013.01); *B60T 8/447* (2013.01); *B60T 8/4872* (2013.01); *B60T 13/745* (2013.01)

(58) Field of Classification Search
CPC .............. B60T 1/00; B60T 8/00; B60T 13/00
USPC ........................ 701/70, 78, 83, 96; 303/113.3
See application file for complete search history.

(56) References Cited

U.S. PATENT DOCUMENTS

| | | | | |
|---|---|---|---|---|
| 5,367,942 | A * | 11/1994 | Nell et al. .................. | 303/113.4 |
| 5,887,954 | A * | 3/1999 | Steiner et al. .............. | 303/113.4 |
| 6,050,654 | A * | 4/2000 | Gegalski et al. ........... | 303/119.2 |
| 6,267,208 | B1* | 7/2001 | Koepff ......................... | 188/164 |
| 6,568,182 | B2* | 5/2003 | Linden et al. ................ | 60/545 |
| 6,568,768 | B1* | 5/2003 | Oka et al. .................. | 303/113.3 |

(Continued)

FOREIGN PATENT DOCUMENTS

| | | |
|---|---|---|
| JP | 2006-281992 A | 10/2006 |
| WO | 2007080106 A1 | 7/2007 |

*Primary Examiner* — Truc M Do
(74) *Attorney, Agent, or Firm* — Maginot, Moore & Beck LLP

(57) ABSTRACT

The invention describes a method for operating a controllable electromechanical brake booster and the corresponding brake booster which, via a coupling element between the brake booster and pedal rod, is capable of applying a force in opposition to the pedal activation force of a driver, and can therefore be operated as a pedal simulator. For this purpose, a pedal opposing force can be set by a characteristic curve as a function of a pedal position which is predefined by the driver, and can give the driver a pedal sensation even if there is no reaction of, for example, a conventional brake system. In a further operating mode, the brake booster can be operated in its original form.

20 Claims, 3 Drawing Sheets

(56) References Cited

U.S. PATENT DOCUMENTS

| | | |
|---|---|---|
| 6,652,040 B2 * | 11/2003 | Oka et al. ............... 303/114.1 |
| 7,104,612 B2 * | 9/2006 | Terazawa et al. ........ 303/113.4 |
| 7,347,510 B2 * | 3/2008 | Schluter ................. 303/114.1 |
| 7,921,763 B2 * | 4/2011 | Anderson et al. ........... 91/376 R |
| 2003/0168909 A1 | 9/2003 | Kusano et al. |
| 2004/0145322 A1 * | 7/2004 | Trutschel et al. ............ 318/139 |
| 2005/0001481 A1 * | 1/2005 | Kley et al. ................... 303/191 |
| 2005/0023891 A1 * | 2/2005 | Terazawa et al. ........ 303/114.1 |
| 2006/0163941 A1 * | 7/2006 | Von Hayn et al. ........... 303/155 |
| 2007/0001508 A1 * | 1/2007 | Schluter ................. 303/114.3 |
| 2008/0196983 A1 * | 8/2008 | Von Hayn et al. ............ 188/156 |
| 2008/0217122 A1 * | 9/2008 | Von Hayn et al. ............ 188/159 |
| 2008/0257670 A1 * | 10/2008 | Drumm et al. ............... 188/358 |
| 2009/0115242 A1 * | 5/2009 | Ohtani et al. ................... 303/3 |
| 2009/0115247 A1 * | 5/2009 | Leiber et al. ................. 303/154 |
| 2010/0026083 A1 * | 2/2010 | Leiber et al. ..................... 303/3 |
| 2010/0114444 A1 * | 5/2010 | Verhagen et al. ............... 701/70 |
| 2010/0154408 A1 * | 6/2010 | Anderson et al. .............. 60/556 |
| 2010/0269683 A1 * | 10/2010 | Anderson et al. ............ 91/369.1 |
| 2011/0146395 A1 * | 6/2011 | Vollert et al. .................. 73/132 |
| 2011/0178687 A1 * | 7/2011 | Anderson et al. .............. 701/70 |

* cited by examiner

OPERATION OF A BRAKE BOOSTER AS A PEDAL SIMULATOR

CROSS-REFERENCE TO RELATED APPLICATION

This application is a 35 USC 371 application of PCT/EP2009/065196 filed on Nov. 16, 2009.

BACKGROUND OF THE INVENTION

1. Field of the Invention

The invention is based on a brake booster in a motor vehicle by means of which it is possible to boost a force that a driver exerts by means of a brake pedal. The brake booster is embodied so that a counteracting force that acts on the brake pedal is produced, which acts in opposition to the force exerted by the driver. The invention is also related to a method for how a brake booster can be operated as a pedal simulator as part of a brake system.

2. Description of the Prior Art

An electromechanical brake force booster is known from DE 102007016136 A1. In it, in order to determine a pedal force exerted by a driver, an evaluation and control unit is used, which calculates the currently effective pedal force from a difference between a total brake force and an additional brake force. Pedal-travel simulators are known, for example, from the *Manual of Automotive Engineering* (25$^{th}$ edition, BOSCH, Vieweg Verlag ISBN 3528238763). In an electrohydraulic brake, they are part of an actuation unit and make it possible to implement a suitable force-travel curve and an appropriate damping of the brake pedal. Consequently, during braking with an electrohydraulic brake, the driver is given the same braking feel as in a very well-designed conventional brake system.

ADVANTAGES AND SUMMARY OF THE INVENTION

Brake pedal simulators known from the prior art require additional mechanisms for producing a counteracting force that acts in opposition to the force exerted by the driver in order to adjust a force-travel characteristic curve at the brake pedal that represents the pedal feel. The advantage of the present invention lies in the fact that the pedal feel, i.e. in particular this force-travel characteristic curve, is adjusted by using a brake booster that is already integrated into the vehicle for purposes of brake boosting. Thus for example vehicles with hybrid brake systems can have electromechanical brake boosters similar to the kind described in the prior art. In the context of the present invention, such an electromechanical brake booster is operated as a pedal simulator. Because according to the present invention, the brake pedal feel is produced by the electromechanical brake booster without additional mechanisms in the vehicle, it is possible to reduce costs and the amount of space required. In another operating mode, the brake booster can also be used for its usual purpose and can boost an incoming brake force exerted by the driver.

In a particularly advantageous embodiment of the invention, the counteracting force can be adjusted as a function of the brake pedal actuation. This advantageously makes it possible to adjust the brake pedal feel to any desired setting.

In another advantageous embodiment of the invention, the brake booster is equipped with an input rod connected to the brake pedal and an elastic element. In this embodiment, the counteracting force is exerted by means of a deformation of the elastic element caused by a compression of it by the end of the input rod oriented away from the brake pedal. An actuating drive can be provided for compressing the elastic element. This embodiment has the advantage that knowledge of the elasticity of the elastic element is used to implement the force reaction on the brake pedal through a simple and therefore inexpensive displacement measurement (amount of deflection from the input rod to the elastic element). A more complex measurement of the pedal force is therefore not necessary.

In a particularly advantageous embodiment of the invention, a connecting elements is provided for coupling the actuating drive to the elastic element. By virtue of the connecting element, this coupling is detachable and/or limited in its action. Because the connecting element is only able to transmit a limited force, i.e. the coupling is limited in its action, the brake booster according to the invention is able to exert only a limited force in opposition to the driver. If the connecting element is acted on with a greater force, the force acting on the brake pedal remains the same (limited action) or decreases to zero (coupling is detached). This has the advantage that the force that acts in opposition to the driver and can therefore impede or prevent a pedal actuation by the driver is limited to a value that can be controlled by the driver. In order for the counteracting force—which acts in opposition to the brake force exerted by the driver—to be produced in the manner according to the invention, the coupling by means of the connecting element must be produced.

In another advantageous embodiment of the invention, depending on the actuation of the brake pedal, in particular depending on the brake pedal travel, either the force exerted by the driver is boosted (brake booster mode) or the counteracting force is produced (pedal simulator mode). For example if the driver only presses the brake pedal a limited distance, then the brake booster functions according to the invention as a pedal simulator, i.e. the counteracting force is produced. In this case, the brake force acting on the vehicle can be produced for example through regenerative braking and/or through an increase in the engine drag-torque. The counteracting force according to the invention gives the driver a conventional pedal feel in this operating mode as well. If the driver presses the brake pedal a greater distance, then the normal service brake acts on the vehicle and the brake booster according to the invention then performs an assisting function for the force exerted by the driver.

DESCRIPTION OF THE PREFERRED EMBODIMENTS

The invention describes an electromechanical brake booster as well as a method for controlling an electromechanical brake booster in order to operate it as a pedal simulator.

The brake system to be operated can, for example, be composed of the following components.
- Regulatable electromechanical brake booster
- Brake master cylinder
- Hydraulic brake system (conventional, not shown)
- Definable free travel ds between the connecting piece 103 of the regulatable brake booster and the brake master cylinder 107
- Subsequent/additional external force system (not shown)

A brake system composed of these components can be used in the following operating modes, among others:
- External three mode (according to FIG. 1): buildup of brake pressure through external force (ESP) or braking deceleration e.g. by means of a regenerative braking system, and generation of pedal feel by means of the brake booster; the connecting piece 103 and brake master cylinder 107 are spatially separate. (Pedal travel s<ds)
- Brake boosting mode (according to FIG. 2): standard operation of the regulatable brake booster. Buildup of brake pressure through driver-exerted force 111 and boosting force 113 by means of regulatable brake booster. Generation of pedal feel by means of regulatable brake booster in combination with reaction force of the brake system. Output rod and master cylinder in contact. (Pedal travel s>ds)

The present invention relates primarily to the external force mode. In this mode, the brake booster functions purely as a pedal simulator.

Figure 1:
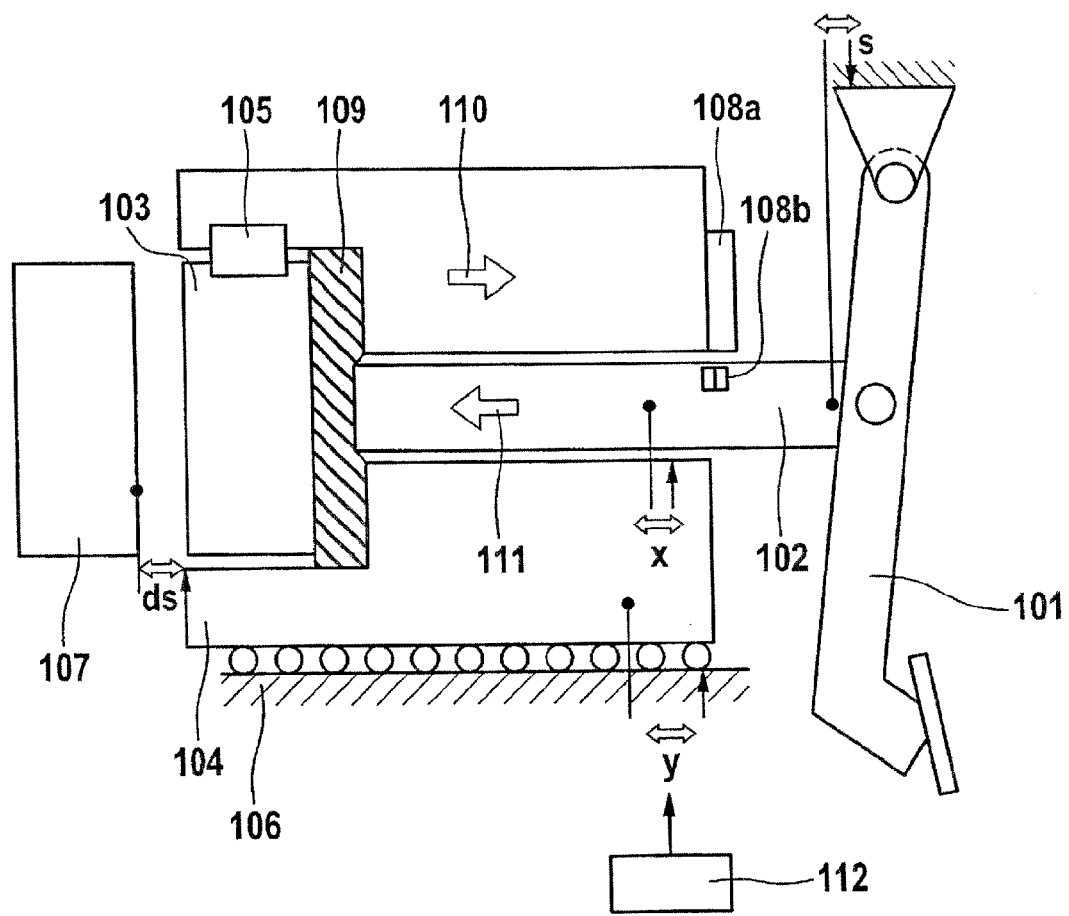
FIG. 1 shows a typical exemplary embodiment of a regulatable electromechanical brake booster in the operating mode in which it functions as a pedal simulator with an engaged coupling element between the booster element and the connecting piece to the master cylinder as well as an elastic element for adjusting the characteristic curve of the pedal.
Figure 2:
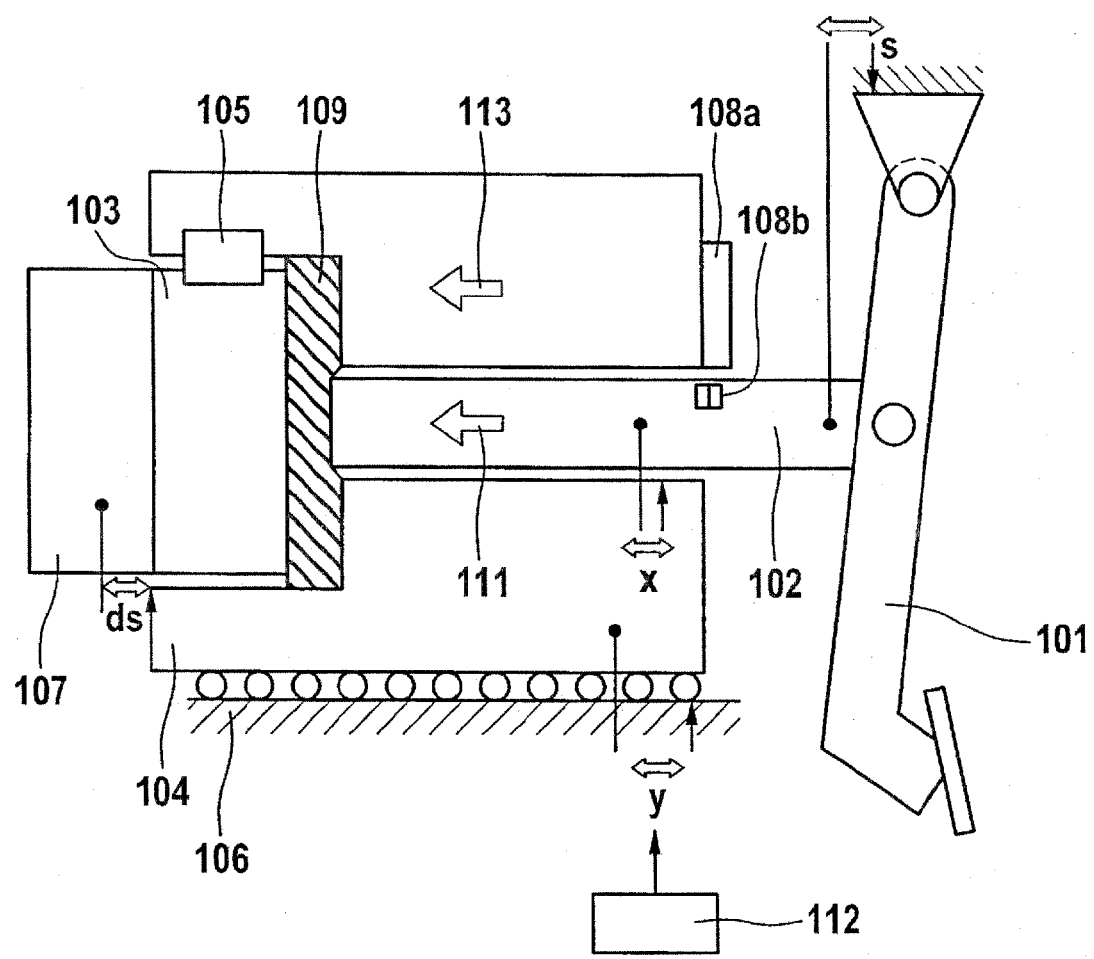
FIG. 2 shows a typical exemplary embodiment of a regulatable electromechanical brake booster in the operating mode in which it functions as a brake booster with a coupling element that is engaged or is limited in its action between the booster element and the connecting piece to the master cylinder.
Figure 3:
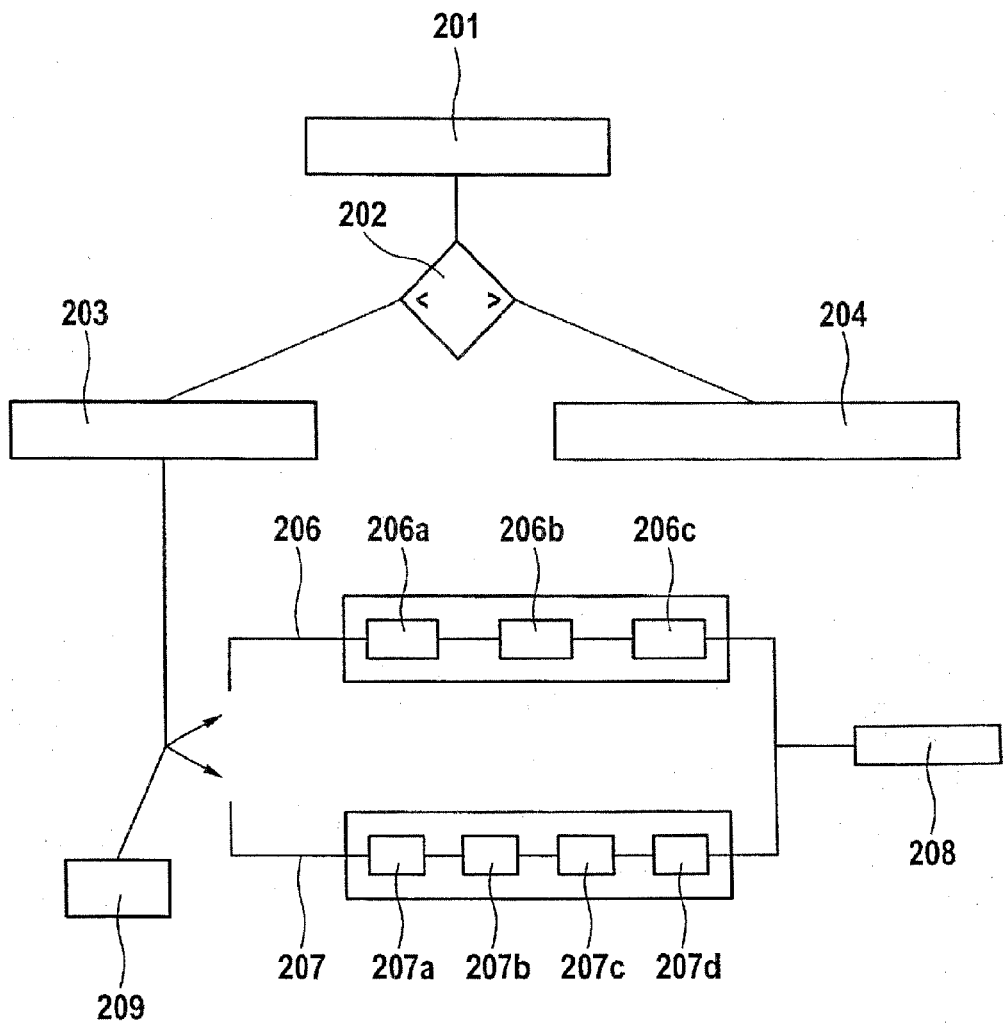
FIG. 3 is a schematic depiction of the method according to the invention by means of which the brake booster can be operated as a pedal simulator.

In FIG. 1, an actuating unit 101 is connected to an input rod 102 and can slide the latter relative to a boosting element 104 of a brake booster. Between the input rod 102 and the connecting piece 103 to the master cylinder 107, there is an elastic element 109, e.g. a reaction disc 109, with a known elasticity $c_{RD}$, which is affixed to the connecting piece 103 and permits a sliding motion x of the input rod 102 and boosting element 104 relative to each other along their shared axis. The boosting element can be slid by a distance y relative to the housing 106 of the brake booster, e.g. by means of an electric motor (not shown). The total sliding motion s of the connecting piece 103 relative to the master cylinder 107 results from the sum of x and y.

The relative deflection x of the input rod 102 in relation to the boosting element 104 can be measured by means of a displacement Sensor 108a, 108b. The relative sliding motion y of the boosting element 104 in relation to the housing 106 of the booster element 104 can be determined, for example, from the motor position.

If the total sliding motion s is less than the predetermined free travel ds, then there is no contact between the connecting piece 103 and the master cylinder 107; the entire brake force is exerted by the external force. The brake system is in the external force mode and the brake booster functions as a pedal simulator.

A generation of pedal feel by means of a pedal simulator on the brake pedal 101 requires a force 110, which acts in opposition to the actuation force 111 exerted by the driver and should be exerted by the regulatable brake booster in the external force mode. For this purpose, a coupling element 105 can provide a connection between the booster element 104 and the connecting piece 103 to the master cylinder 107.

The coupling element 105 can be embodied in various ways; a combination of a permanent magnet and an electromagnet is one example. In another embodiment, the coupling element can be a magnetorheological damper. In this embodiment, the damper is composed of a piston/cylinder unit; one component of this unit is connected to the booster element and the other is connected to the connecting piece, for example. The two chambers of the cylinder separated by the piston have a connection; in addition, the viscosity of the liquid and thus the damping behavior of the damper can be adjusted by means of an electrical triggering.

In another embodiment, the connection between the two chambers of the cylinder can be embodied in the form of a controllable valve that can be used to adjust the damping (until the locking occurs).

In another embodiment, the coupling element likewise includes a piston/cylinder unit and an electrically triggerable valve, but the cylinder only has one working chamber. Brake fluid from a brake fluid reservoir is used as the liquid.

Depending on its switching, the electrically triggerable valve causes a volume exchange with the brake fluid reservoir so that no coupling occurs or else seals off the volume in the working chamber of the piston/cylinder unit so that a coupling does occur. Naturally, other coupling options are also conceivable.

The coupling element 105 can be designed to limit the maximum deployable force to a predefined value in order to permit the driver to apply excess pressure to this coupling.

When the coupling between the booster element 104 and the connecting piece 103 is engaged, a sliding of the booster element 104 can move the elastic element 109 connected to the connecting piece 103 parallel to the input rod 102, in the direction toward this input rod and/or away from it.

In such a movement, when the end of the input rod oriented away from the brake pedal comes into contact with the elastic element 109, this causes the elastic element 109 to deform so that it transmits a counteracting force to the input rod 102, which force depends on the deformation of the elastic element and therefore on the relative sliding motion x.

It is thus possible, for example, to boost or reduce an existing deformation of the elastic element 109 by means of the input rod 102 and a resulting counteracting force as needed.

In the present invention, this principle is used to vary the counteracting force depending on the absolute position of the input rod.

A pedal simulator is used to determine the brake force to be set in the vehicle and to give the pedal feel to the driver. In order to ensure this, frequently a force sensor is used to determine the pedal actuating force exerted by the driver or else another measurement device is used, which represents the pedal actuating force and is situated on the pedal rod.

In the method characterizing the invention, the regulation of the pedal simulator is carried out directly by means of elements present in the brake booster.

The method is composed of the following steps:

In a first method step 201, a pedal travel s of the input rod 102 is determined. The pedal travel can be measured directly by means of a displacement sensor not shown in FIGS. 1 and 2 or indirectly by means of the relation s=x+y (x is determined by the sensor 108, the determination of the motor position y is not shown in FIGS. 1 and 2).

In another method step 202, the determination is made as to whether the input rod 102 has executed a pedal travel s<ds or a pedal travel s>ds upon actuation of the brake pedal. As a function of this, the decision is made as to whether to operate the brake booster in the brake boosting mode 204 (pedal travel s>ds) or as a pedal simulator 203 (pedal travel s<ds).

It is clear that the determination made at method step 202 regarding the operating mode does not necessarily have to be made based on the pedal travel s. It is equally conceivable, for example, to use a limit value for the change of the pedal travel over time. If the brake booster is operated as a pedal simulator 203, then in the embodiment shown, the method can be continued in one of two possible operation types 206 or 207.

The use of the operation types 206 and 207 depends on the operating situation of the brake booster. If the brake is actuated starting from the starting position of the brake pedal, i.e. from the "unbraked" vehicle state, then operation type 206 is the appropriate choice. If the vehicle is already being (hydraulically) braked, i.e. if a switch of the brake booster from the brake boosting mode into the "pedal simulator" operating mode takes place in the already actuated state, then the operation type 207 is the appropriate choice.

The decision regarding the above-explained operating situation and therefore for the continuation of the method via operation types 206 or 207 is made in a mode selection by means of a decision unit 209.

In the first operation type 206, the present or currently existing relative deflection x is established as a starting point. The method progresses through the following steps:
  Step 206a: determination of the relative deflection x by means of a sensor 108
  Step 206b: calculation of a motor position y to be adjusted based on a characteristic curve
  Step 206c: adjustment of this motor position y through a corresponding actuation of the actuating drive 112.

In the second operation type 207, the driver has already actuated the pedal and the motor 112 is in position y. Then a counteracting force corresponding to the position y is adjusted.

The method progresses through the following steps:
  Step 207a: determination of the deflection y by means of a position sensor, not shown.
  Step 207b: determination of a setpoint value of the pedal counteracting force 110 to be adjusted by means of a characteristic curve
  Step 207b: determination of a setpoint value for the relative deflection x corresponding to the determined counteracting force, through knowledge of the elasticity $c_{RD}$ of the reaction disc.
  Step 207d: setting of this setpoint value for the relative deflection x For both possible embodiments of the method via operation types 206 and 207, the end state 208 is a counteracting force directed in opposition to the actuating force exerted by the driver. This counteracting force can be adjusted by means of the characteristic curves of steps 206b and 207b.

It should be noted that the control of the electromechanical brake booster, just like the determination made at method step 202, can also be carried out by means of other travel-dependent values.

It can be stated in summary that the invention describes a controllable electromechanical brake booster and a method for operating said brake booster, which by means of a coupling element between the brake booster and the pedal rod, is in a position to exert a force in opposition to the pedal actuating force exerted by a driver and can consequently be operated as a pedal simulator. To this end, a pedal counteracting force can be adjusted by means of a characteristic curve as a function of a pedal position predetermined by the driver and the driver is given a pedal feel even when no reaction—e.g. of a conventional brake system—is occurring. In another operating mode, the brake booster can be operated in its original fashion.

The foregoing relates to the preferred exemplary embodiments of the invention, it being understood that other variants and embodiments thereof are possible within the spirit and scope of the invention, the latter being defined by the appended claims.

The invention claimed is:

1. A brake booster that is mounted in a motor vehicle and is configured to boost a force exerted by a driver on a brake pedal and to produce a counteracting force on the brake pedal acting in opposition to the force exerted by the driver, the brake booster comprising:
  a motor configured in a first mode of operation to actuate a boosting element to actuate a master cylinder of the motor vehicle and in a second mode of operation to actuate the boosting element so as to set the counteracting force acting on the brake pedal as a function of one of a pedal travel distance during a brake pedal actuation and the force exerted by the driver on the brake pedal during the brake pedal actuation.

2. The brake booster according to claim 1, further comprising:
  an input rod having a first end connected to the brake pedal and a second opposite end; and
  an elastic element configured to deform to exert the counteracting force on the brake pedal when the elastic element is compressed into the second end of the input rod,
  wherein the motor is configured to slide the elastic element and compress the elastic element into the second end of the input rod to produce the counteracting force.

3. The brake booster according to claim 1, wherein at any given time depending on the brake pedal actuation, the motor is configured to perform only one of boosting the force exerted by the driver and producing the counteracting force.

4. A brake booster that is mounted in a motor vehicle and is configured to boost a force exerted by a driver on a brake pedal and to produce a counteracting force on the brake pedal acting in opposition to the force exerted by the driver, the brake booster comprising:
  an actuating drive configured to (i) actuate a master cylinder of the motor vehicle and (ii) set the counteracting force acting on the brake pedal as a function of the force exerted by the driver on the brake pedal during a brake pedal actuation;
  an input rod having a first end connected to the brake pedal and a second opposite end;
  an elastic element configured to deform to exert the counteracting force on the brake pedal when the elastic element is compressed into the second end of the input rod; and
  a sensor configured to detect a deflection value representing a relative deflection of the input rod in relation to the elastic element,
  wherein the actuating drive is configured to slide the elastic element and compress the elastic element into the second end of the input rod to produce the counteracting force, and
  wherein the actuating drive adjusts a magnitude of the counteracting force by setting the deflection value of the input rod relative to the elastic element.

5. The brake booster according to claim 4, wherein the setting of the deflection value occurs in such a way that a position of the actuating drive is set as a function of the relative deflection of the input rod in relation to the elastic element induced by the brake pedal actuation, or the deflection value is set as a function of the position of the actuating drive.

6. The brake booster according to claim 4, wherein a connecting element is provided that couples the actuating drive to the elastic element and the coupling is detachable and/or limited in its action.

7. The brake booster according to claim 6, wherein the connecting element is provided in such a way that the coupling between the actuating drive and the elastic element is detachable as a function of the force exerted by the driver on the brake pedal, and/or the coupling between the actuating drive and the elastic element is engaged in order to produce the counteracting force.

8. The brake booster according to claim 4, wherein a pedal travel of the input rod is used to represent the force exerted by the driver on the brake pedal.

9. A brake booster that is mounted in a motor vehicle and is able to boost a force exerted by a driver by means of a brake pedal, the brake booster being embodied so that it is able to produce a counteracting force acting on the brake pedal, which acts in opposition to the force exerted by the driver, the brake booster comprising:
  an input rod connected to the brake pedal;
  an elastic element; and
  an actuating drive,
  wherein the counteracting force is exerted by a deformation of the elastic element caused when it is compressed by an end of the input rod oriented away from the brake pedal, and wherein the actuating drive is able to slide the elastic element connected to the actuating drive, and compression of the elastic element occurs through an actuation of the actuating drive,
  wherein the brake booster has a sensor configured to detect a deflection value representing a relative deflection of the input rod in relation to the elastic element, and the actuating drive adjusts a magnitude of the counteracting force by setting the deflection value of the input rod relative to the elastic element, and
  wherein a connecting element is provided that couples the actuating drive to the elastic element and this coupling is detachable and/or limited in its action.

10. The brake booster according to claim 9, wherein the connecting element is provided in such a way that the coupling between the actuating drive and the elastic element is detachable as a function of the brake pedal actuation, in particular as a function of the brake pedal force, and/or the coupling between the actuating drive and the elastic element is engaged in order to produce the counteracting force.

11. The brake booster according to claim 9, wherein the actuating drive is configured to boost the force exerted by the driver in a first mode of operation and to slide the elastic element to produce the counteracting force in a second mode of operation.

12. The brake booster according to claim 9, wherein the counteracting force is adjustable as a function of the brake pedal actuation.

13. A brake booster that is mounted in a motor vehicle and is able to boost a force exerted by a driver by means of a brake pedal, the brake booster being embodied so that it is able to produce a counteracting force acting on the brake pedal, which acts in opposition to the force exerted by the driver, the brake booster comprising:
  an input element;
  a boosting element;
  an actuating drive;
  a sensor; and
  a connecting piece,
  wherein the brake pedal is coupled to the input element, the input element and the boosting element are connected to each other in a way that permits them to move relative to each other by a distance, and the actuating drive is able to slide the boosting element by a distance relative to a housing of the brake booster containing at least the input rod and the boosting element,
  wherein the sensor is provided on the input element in order to detect a relative deflection of the boosting element in relation to the input rod,
  wherein the connecting piece and the boosting element are connectable to each other in a way that permits them to move relative to each other, which connecting piece is in detachably connected to the booster element by a connecting element and at its end oriented toward the brake pedal, the connecting piece is connected to an elastic element, and
  wherein a free travel is provided between the connecting piece and the brake master cylinder.

14. A method for operating a brake booster in a motor vehicle, which is configured to boost a force exerted by a driver on a brake pedal, comprising:
  operating a motor of the brake booster in a first mode of operation to actuate a boosting element to actuate a master cylinder of the motor vehicle;
  operating the motor in a second mode of operation to actuate the boosting element to set a counteracting force acting on the brake pedal in opposition to the force exerted by the driver on the brake pedal; and
  adjusting the operation of the motor in the second mode of operation to adjust the counteracting force as a function of one of a pedal travel distance and the force exerted by the driver on the brake pedal.

15. The method according to claim 14, the operation of the motor to produce set the counteracting force further comprising:
  operating the motor of the brake booster to slide an elastic element connected to the motor and compress the elastic element into an input rod connected to the brake pedal to produce the counteracting force acting in opposition to the force exerted by the driver on the brake pedal.

16. The method according to claim 14, wherein at any given time depending on the brake pedal actuation, the motor is operated to perform only one of boosting the force exerted by the driver and producing the counteracting force.

17. A method for operating a brake booster in a motor vehicle, which is configured to boost a force exerted by a driver on a brake pedal, comprising:
  operating an actuation drive of the brake booster to actuate a master cylinder of the motor vehicle;
  operating the actuating drive of the brake booster to slide an elastic element connected to the actuating drive and compress the elastic element into an input rod connected to the brake pedal to produce a counteracting force acting in opposition to the force exerted by the driver on the brake pedal;
  determining a deflection value representing a relative deflection of the input rod in relation to the elastic element using a sensor;
  adjusting the operation of the actuating drive to adjust the counteracting force as a function of the force exerted by the driver on the brake pedal; and
  adjusting the operation of the actuating drive to adjust a magnitude of the counteracting force by setting the deflection value of the input rod relative to the elastic element.

18. The method according to claim 17, further comprising:
operating the actuating drive to set the deflection value such that a position of the actuating drive is set as a function of the relative deflection of the input rod in relation to the elastic element induced by the brake pedal actuation, or operating the actuating drive to set the deflection value as a function of the position of the actuating drive.

19. The method according to claim 18, wherein at any given time depending on the brake pedal actuation, the actuating drive is operated to perform only one of boosting the force exerted by the driver and producing the counteracting force.

20. The brake booster according to claim 17, wherein the adjusting of the operation of the actuating drive includes determining a pedal travel of the input rod to determine the force exerted by the driver on the brake pedal.

* * * * *